US006446000B2

(12) United States Patent
Shimabara (10) Patent No.: US 6,446,000 B2
(45) Date of Patent: Sep. 3, 2002

(54) NAVIGATION SYSTEM (75) Inventor: Daisuke Shimabara, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/804,732

(22) Filed: Mar. 13, 2001

(30) Foreign Application Priority Data

Mar. 28, 2000 (JP) ........................................ 2000-088159

(51) Int. Cl.[7] ............................................. G06F 165/00
(52) U.S. Cl. ....................... 701/209; 701/207; 701/208; 701/211
(58) Field of Search ................................. 701/209, 208, 701/207, 212, 210, 211, 213; 340/990–995

(56) References Cited

U.S. PATENT DOCUMENTS

| 5,206,811 | A | * | 4/1993 | Itoh et al. ..................... 701/211 |
| 5,684,704 | A | * | 11/1997 | Okazaki et al .............. 701/208 |
| 5,757,289 | A | * | 5/1998 | Nimura et al. ............... 340/995 |
| 6,018,697 | A | * | 1/2000 | Morimoto et al. .......... 701/209 |
| 6,035,253 | A | | 3/2000 | Hayashi et al. |
| 6,061,628 | A | * | 5/2000 | Hayashie et al. ............ 701/208 |
| 6,067,502 | A | * | 5/2000 | Hayashida et al. ......... 701/209 |
| 6,125,323 | A | * | 9/2000 | Nimura et al. ............... 701/207 |
| 6,169,956 | B1 | * | 1/2001 | Morimoto et al. .......... 701/209 |
| 6,269,304 | B1 | * | 7/2001 | Kaji et al. .................... 701/209 |
| 6,269,305 | B1 | * | 7/2001 | Yamashita et al. .......... 701/211 |

* cited by examiner

Primary Examiner—Richard M. Camby
(74) Attorney, Agent, or Firm—Brinks Hofer Gilson & Lione (57) ABSTRACT A guidance information setting unit specifies, during a route guidance operation, a first intersection that the vehicle is about to pass and a second intersection that the vehicle is to pass thereafter, where the vehicle makes a right-turn or a left-turn. Next, the guidance information setting unit sets a recommended travel lane by which the vehicle minimizes the lane change frequency until it reaches the second intersection, and outputs information concerning the recommended travel lane to an intersection guidance unit as the guidance information. The intersection guidance unit produces, as the intersection guidance information concerning the first intersection, drawing data of the intersection guidance information that displays with emphasis the recommended travel lane set by the guidance information setting unit, and displays the data on the screen of a display unit through an image synthesizing unit. As a consequence, the navigation system of the invention ensures an appropriate travel state for the vehicle.

16 Claims, 9 Drawing Sheets

NODE TABLE

| #0 NODE RECORD |
|---|
| #1 NODE RECORD |
| #2 NODE RECORD |
| ⋮ |

FIG. 2(B)

CONNECTION NODE TABLE

| NORMALIZED LONGITUDE OF NODE |
|---|
| NORMALIZED LATITUDE OF NODE |
| ATTRIBUTE FLAG OF NODE |
| NUMBER OF NODES CONNECTED |
| NUMBER OF TRAFFIC REGULATIONS |
| ⋮ |
| #0 CONNECTION NODE RECORD (LINK NUMBER) |
| #1 CONNECTION NODE RECORD (LINK NUMBER) |
| ⋮ |
| #0 TRAFFIC REGULATION RECORD |
| #1 TRAFFIC REGULATION RECORD |
| ⋮ |
| ADJOINING NODE RECORD |
| STORAGE LOCATION OF INTERSECTION RECORD |
| SIZE OF CONCERNED INTERSECTION RECORD |

FIG. 2(C)

LINK TABLE

| #0 LINK RECORD |
|---|
| #1 LINK RECORD |
| #2 LINK RECORD |
| ⋮ |

LINK RECORD

| LINK ID |
|---|
| NODE NUMBER 1 |
| NODE NUMBER 2 |
| DISTANCE |
| COST |
| RODE ATTRIBUTE FLAG |
| RODE TYPE FLAG |
| ROUTE NUMBER |

FIG. 3

INTERSECTION UNIT

| UNIT IDENTIFICATION CODE |
|---|
| #0 INTERSECTION RECORD |
| #0 INTERSECTION DIRECTION INFORMATION RECORD |
| #0 INTERSECTION LANE INFORMATION RECORD |
| #0 INTERSECTION DRAWING RECORD |
| #1 INTERSECTION RECORD |
| #1 INTERSECTION DIRECTION INFORMATION RECORD |
| #1 INTERSECTION LANE INFORMATION RECORD |
| #1 INTERSECTION DRAWING RECORD |
| ⋮ |

FIG. 4

| NODE NS (STARTING POINT) |
|---|
| NODE N1 |
| NODE N2 |
| ⋮ |
| NODE ND (DESTINATION) |

NAVIGATION SYSTEM

BACKGROUND OF THE INVENTION

1. Field of the Invention

The present invention relates to a navigation system that provides a driver with route guidance information by displaying the maps and intersections surrounding the driver's vehicle.

2. Related Art

In general, a navigation system for a vehicle detects the current position of the vehicle and reads out the map data for the area surrounding the vehicle from a storage medium such as a CD, DVD, and the like to present the map on a display. The system also displays a vehicle position mark that illustrates the vehicle position at a specific place on the display, and scrolls the map surrounding the vehicle to follow its movement with the vehicle position mark in the center, whereby the driver is kept informed of the map information for the area surrounding the vehicle position.

Further, almost all of the recent vehicle navigation systems are equipped with a route guidance function whereby a user is able to travel to a desired destination without taking a wrong road. This route guidance function automatically searches for the route of a minimum cost that connects the starting point and the destination set by the user, and draws the searched guidance route thicker on the map with a different color than the other roads. When the vehicle approaches an intersection on the guidance route, the system also displays an enlarged map for the area surrounding the intersection, and displays an arrow, for example, indicating the lane that the vehicle should take, whereby the user is able to recognize the route to take.

When guiding along the travel lanes in the intersection (hereunder, referred to as "the first intersection") that the vehicle is about to pass through, the conventional navigation system does not pay attention to the state of the guidance route after passing through the first intersection, and displays an arrow or the like to all the lanes that the vehicle can take when passing through the first intersection. However, there is a possibility, depending on the state of the guidance route, that all the lanes that the vehicle can take at the time of passing through the first intersection are not always appropriate for the travel along the guidance route thereafter.

As a specific example, suppose that the vehicle travels straight through the first intersection along the guidance route, and turns right at the next intersection (hereunder, referred to as "the second intersection"). It is also assumed that there are three lanes at the first intersection, all of which are directly advancing lanes, and there are three lanes at the second intersection, among which two are directly advancing lanes and one is a right-turn lane. In such a situation, considering that the vehicle turns right at the second intersection, it is desirable that the vehicle should change the travel lane into the right lane at the first intersection if possible. However, in the guidance of the travel lane in the conventional navigation system, when the vehicle travels in the left lane of the three directly advancing lanes immediately before passing through the first intersection, the system will display arrows or the like on all three lanes as a lane that the vehicle can take, since the three lanes are directly advancing and the guidance route at that moment is directly advancing at the first intersection. The driver, viewing this guidance of the travel lane, might remain in the left lane that the vehicle took until then.

Here, if the distance between the first intersection and the second is relatively short, or if there is much traffic on the road, the driver will not be able to change the travel lane into the innermost right-turn lane before the vehicle reaches the second intersection, after the lane guidance relating to the second intersection is presented. Consequently, the vehicle travels along a lane that deviates from the guidance route at the second intersection.

SUMMARY OF THE INVENTION

As described in the foregoing example, lane guidance at an intersection that the conventional navigation system provides has the problem that it does not provide a more appropriate travel state in consideration of the state of the guidance route after passing through the first intersection.

The present invention has been made in view of the foregoing problem, and it is an object of the invention to provide a navigation system whereby a vehicle can receive the appropriate travel state as described above. In order to accomplish this, in the navigation system of the invention, a route search means executes route search processing to thereby set a travel route of a vehicle. On the basis of the set travel route, a guidance information setting means sets guidance information concerning a first intersection that the vehicle passes, in consideration of the conditions of passage at a second intersection that the vehicle passes thereafter, and an intersection guidance means communicates the set guidance information to the driver. Thereby, since the navigation system is able to provide guidance concerning the first intersection that the vehicle is going to pass, in consideration of the conditions of passage at the second intersection that the vehicle passes thereafter, the driver easily attains an appropriate travel state.

Further, it is preferable that the guidance information set by the guidance information setting means includes information concerning the recommended travel lanes when the vehicle passes the first intersection, and the intersection guidance means communicates the guidance information by distinctly displaying the recommended travel lanes. Consequently, since the navigation system provides guidance of the travel lane suitable for passing the second intersection after passing the first intersection, the driver is able to avoid an abrupt lane change or a useless lane change after passing the first intersection, and to attain an appropriate travel state with fewer lane changes.

It is also preferable that, when the second intersection is an intersection where the vehicle makes a right-turn or a left-turn next, the guidance information setting means sets guidance information that minimizes the lane change frequency until the vehicle reaches the second intersection. When there are lanes having the same travel conditions, for example, when there are plural directly advancing lanes at an intersection where the travel route of a vehicle is set as directly advancing, since the vehicle is able to travel with the minimum lane change frequency, the driver easily attains an appropriate travel state.

DETAILED DESCRIPTION OF THE PREFERRED EMBODIMENT

The preferred embodiment of a navigation system according to the invention will now be described with reference to the accompanying drawings.

(1) General Construction of the Navigation System

Figure 1:
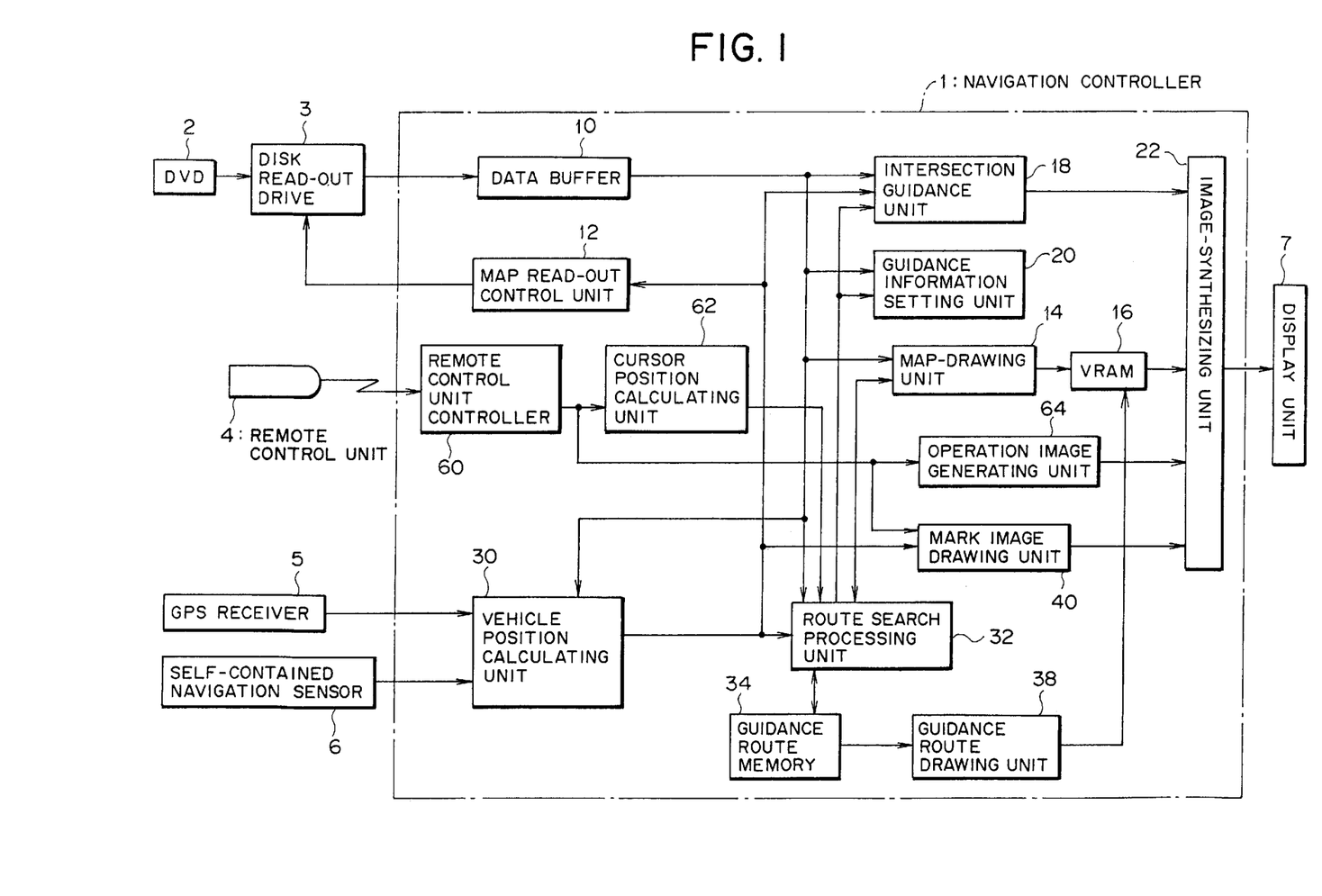
FIG. 1 a block diagram illustrating the general construction of a vehicle navigation system according to one embodiment of the present invention.

FIG. 1 is a block diagram illustrating the general construction of a vehicle navigation system according to a preferred embodiment to which the invention is applied. The navigation system illustrated in FIG. 1 includes a navigation controller 1 that administers overall control, a DVD 2 in which various map data necessary for displaying maps and searching routes and the like are recorded, a disk read-out drive 3 that reads out the map data recorded in the DVD 2, a remote control unit 4 through which a user inputs various types of instructions, a GPS receiver 5 and a self-contained navigation sensor 6 that detect the vehicle position and the vehicle azimuth, and a display unit 7 that displays map images, guidance routes and the like.

The disk read-out drive 3 can be loaded with one or more disks of the DVD 2 and reads out the map data from any one of the DVD 2 under the control of the navigation controller 1. The disk loaded is not necessarily a DVD, and it may be a CD. Further, both a DVD and a CD may be loaded so as to be selectable.

The remote control unit 4 is equipped with several types of keys that a user operates, such as a search key to give a route search instruction, a route guidance mode key to set a route guidance mode, a destination input key, a vertical/horizontal cursor key, a map reduction/expansion key, and a setting key to identify an item at the cursor position on the display. The remote control unit transmits an infrared signal according to the state of a key operation toward the navigation controller 1.

The GPS receiver 5 receives radio waves transmitted from plural GPS receivers, executes three-dimensional position measurement processing or two-dimensional position measurement processing, calculates an absolute position and azimuth of a vehicle (the azimuth is calculated on the basis of the vehicle position at the present time and the vehicle position before one sampling time T), and outputs these together with the time of the position measurement. The self-contained navigation sensor 6 is equipped with an angular sensor such as a vibrational gyroscope that detects a rotation angle of the vehicle as a relative azimuth and a distance sensor that outputs one pulse at each specific travel distance, and it calculates a relative position and azimuth of the vehicle.

The display unit 7 displays, on the basis of the drawing data outputted from the navigation controller 1, a map image for the area surrounding the vehicle together with a vehicle position mark, a starting point mark, a destination mark, etc., and displays a guidance route, intersection guidance information and the like.

(2) Detailed Contents of the Map Data

Next, the contents of the map data recorded in the DVD 2 will be explained in detail. The map data recorded in the DVD 2 assume a rectangular pattern partitioned by a specific longitude and latitude as a unit, and the map data of the patterns each can be specified and read out by designating the pattern number. The map data of the patterns each include a "drawing unit" composed of various data required for displaying a map, a "road unit" composed of necessary data for various processing such as map matching, route searching, and route guiding, and an "intersection unit" composed of detailed data of intersections and the like.

In the road unit, a line connecting two arbitrary points on a road is called a link, and a point connecting two or more links is called a node. The road unit also includes a "unit header" that identifies the road unit, a "connection node table" that contains detailed data of all the nodes, a "node table" that indicates a storage location of the connection node table, and a "link table" that contains detailed data of a link specified by two adjoining nodes.

Figure 2A:
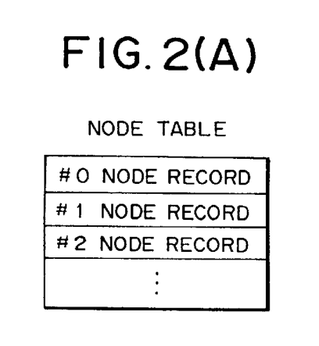
FIG. 2 a chart illustrating detailed contents of various types of tables contained in a road unit.

FIG. 2 illustrates the detailed contents of various types of tables contained in the road unit. The node table stores, as shown in FIG. 2(A), the node records #0, #1, . . . corresponding to all the nodes which are contained in the pattern being identified. The node records each are assigned the node numbers sequentially from #0 in the listed order, and indicate the storage locations of the connection node tables corresponding to the nodes.

Figure 2B:
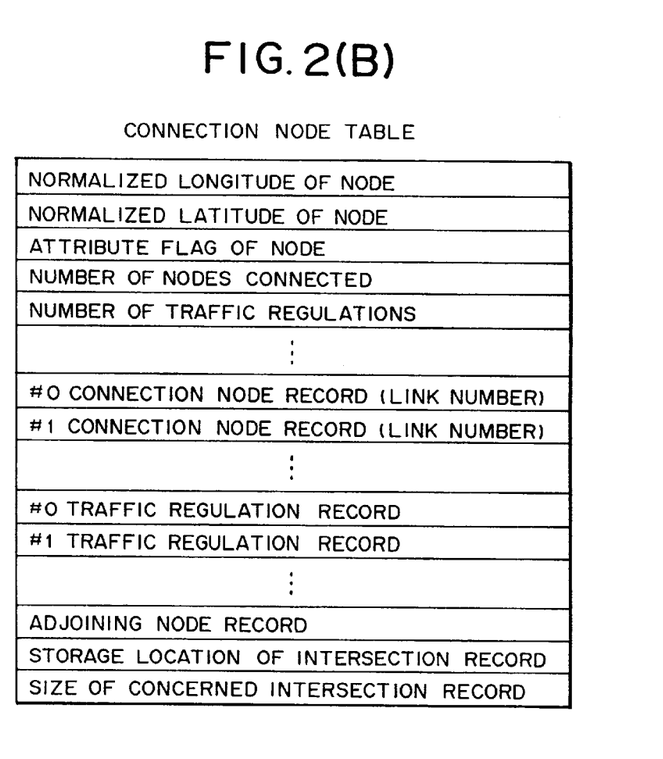

The connection node table contains, as shown in FIG. 2(B), in correspondence with each of the existing nodes:

a. normalized longitude/latitude, b. attribute flag of the node including an intersection node flag indicating whether or not this node is an intersection node, an adjoining node flag indicating whether or not this node is located on the border with another paftem, and a branch information indicating whether or not the link is branched at this node, and if it is branched, indicating whether the branch is a T-shape or a Y-shape, c. number of connected nodes, when there are links of which one end constitutes this node, indicating the number of nodes constituting the other ends of the links, d. number of traffic regulations, when there are traffic regulations such as no right-turn, no U-turn, etc., for the links connected to this node, e. connection node records for the number of links, indicating the link number of each of the links for which one end constitutes this node, f. traffic regulation records, when there are traffic regulations, indicating the specific contents of the traffic regulations corresponding to the number thereof, g. adjoining node record, when this node is a node located on the border with another pattern, indicating the storage location of the connection node table of the corresponding node in the adjoining pattern, h. when this node is an intersection node, storage location and size of the corresponding intersection record in the intersection unit, etc.

Figure 2C:
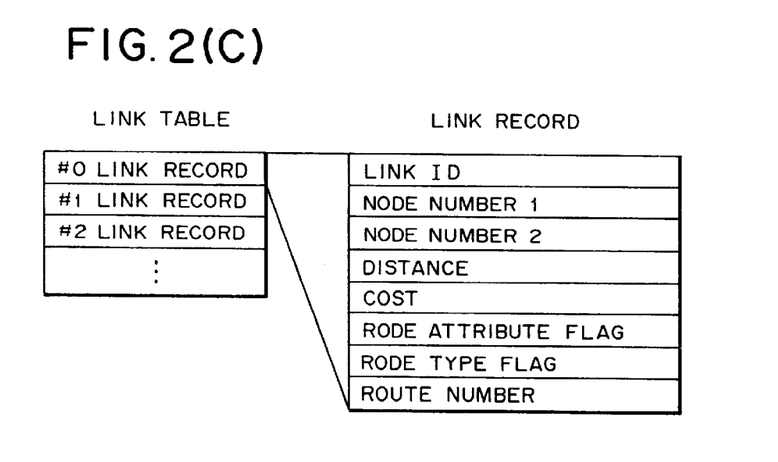

Further, the link table contains, as shown in FIG. 2(C), plural link records in the order of the link numbers, corresponding to all the links that are contained in the pattern being identified. Each of these link records contains:

a. link ID being a code applied to each link mainly for a route search display, b. node number 1 and node number 2 that specify two nodes located on the ends of the link, c. distance (length) of the link, d. cost in traveling this link, e. various road attribute flags including road attribute information (presence of one-way road, etc.) associated with this link, f. road type flag indicating the kind of a road, e.g., the actual road corresponding to this link is a high way or a general road, and the breadth of a road, and g. route number given to a road corresponding to this link.

Figure 3:
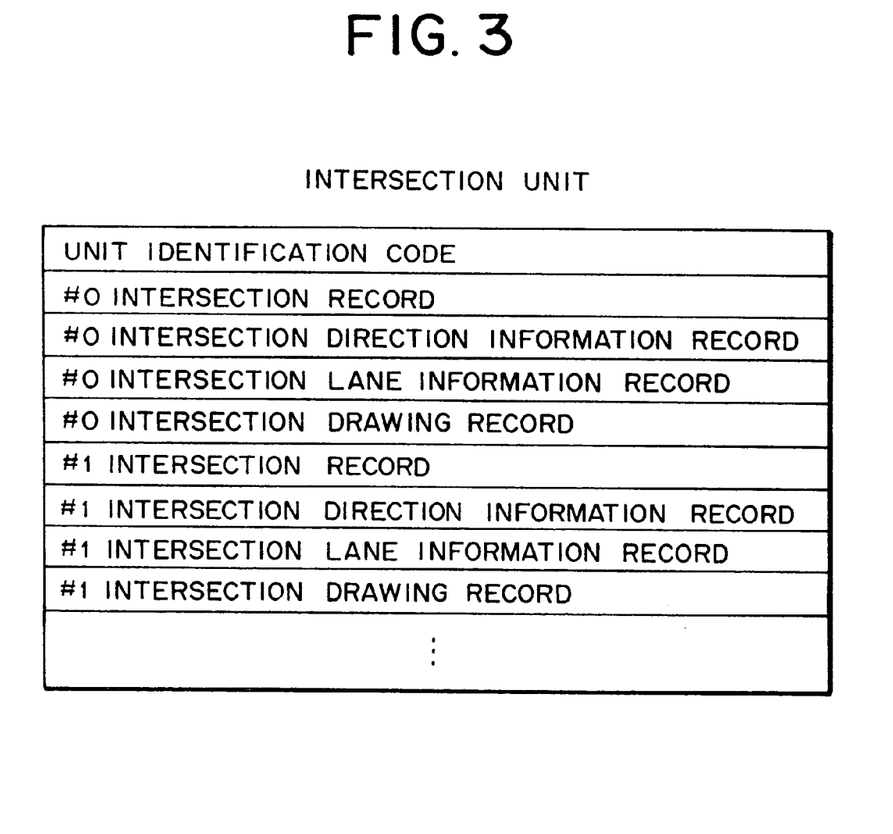
FIG. 3 a chart illustrating detailed contents of an intersection unit.

FIG. 3 illustrates the detailed contents of the intersection unit. As shown in FIG. 3, the intersection unit stores an intersection record including data relating to the intersection itself for each intersection, an intersection direction information record including data relating to the destinations of the road, an intersection lane information record including data relating to the lanes of the road existing in the intersection, etc.

(3) Construction and Operation of the Navigation Controller

Next, the navigation controller shown in FIG. 1 will be explained in detail. The navigation controller 1 includes a data buffer 10 that provides the display unit 7 with the map image for the area surrounding the vehicle position and the intersection guidance information including the lane guidance at an intersection, etc., a map read-out control unit 12, a map-drawing unit 14, a VRAM 16, an intersection guidance unit 18, a guidance information setting unit 20, an image-synthesizing unit 22, a vehicle position calculating unit 30 that calculates the vehicle position and map matching processing, route search processing, and route guidance processing, a route search processing unit 32, a guidance route memory 34, a guidance route drawing unit 38, a mark image drawing unit 40, a remote control unit controller 60 that provides a user with several types of operating images on the display and transfers operating instructions from the remote control unit 4 to the related units, a cursor position calculating unit 62, and an operation image generating unit 64.

The data buffer 10 temporarily stores the map data from the DVD 2 read out by the disk read-out drive 3. When the vehicle position calculating unit 30 calculates the vehicle position, the map read-out control unit 12 sends to the disk read-out drive 3 a read-out request for the map data within a specific area including the vehicle position, and causes the read-out drive 3 to read out the map data for displaying the map from the DVD 2 and store the data in the data buffer 10.

The map-drawing unit 14 produces map drawing data for the display on the basis of the drawing unit contained in the map data stored in the data buffer 10, and stores the produced map drawing data in the VRAM 16.

The intersection guidance unit 18, which provides guidance concerning the intersection that the vehicle is going to pass, produces guidance information for a specific intersection including recommended travel lane information and displays the guidance information on the display screen of the display unit 7.

The guidance information setting unit 20 sets a recommended travel lane, and outputs guidance information including the set travel lane information to the intersection guidance unit 18. Particularly, the guidance information setting unit 20 specifies an intersection that the vehicle is about to pass (hereunder, referred to as "the first intersection") and an intersection that the vehicle passes thereafter, where the vehicle makes a right-turn or a left-turn (hereunder, referred to as "the second intersection"), sets as the recommended travel lane a travel lane by which the vehicle achieves the minimum lane change frequency until it reaches the second intersection, and outputs the set guidance information to the intersection guidance unit 18. The method of setting the guidance information will be detailed later.

The image-synthesizing unit 22 superimposes the map drawing data read out from the VRAM 16 and the drawing data outputted from each of the intersection guidance unit 18, the guidance route drawing unit 38, the mark image drawing unit 40, and the operation image generating unit 64 to synthesize the images, and outputs the synthesized drawing data to the display unit 7.

The vehicle position calculating unit 30 calculates the vehicle position on the basis of the detected data by the GPS receiver 5 and the self-contained navigation sensor 6, and when the calculated vehicle position is not on the road of the map data, executes the map matching processing that corrects the vehicle position. The route search processing unit 32 searches a travel route that connects the destination and the starting point set in advance under a specific condition. For example, under the conditions of the shortest distance, the shortest time, and the like, the travel route of the minimum cost is set as a guidance route. As typical techniques for the route search that are generally known, there are the Dijkstra method and the breadth-first search method. Thus, the guidance route data set by the route search processing unit 32 are expressed as a set of nodes from the starting point to the destination, and are stored in the guidance route memory 34.

Figure 4:
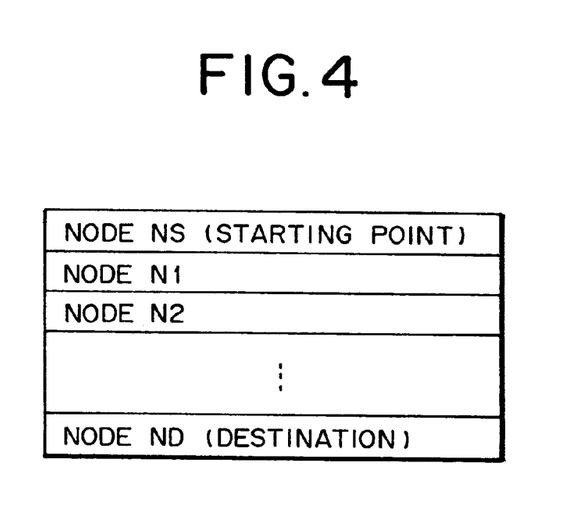
FIG. 4 a chart illustrating one example of data stored in a guidance route memory, FIG. 5 a flow chart illustrating the operation procedure of the navigation system in displaying intersection guidance information.

FIG. 4 illustrates one example of data stored in the guidance route memory 34. As shown in the drawing, the guidance route data set by the route search processing unit 32 are expressed as the set of nodes NS, N1, N2,. . . ,ND from the starting point to the destination, and are stored in the guidance route memory 34.

The guidance route drawing unit 38 selects the data contained in the map area which are to be drawn in the VRAM 16 at that time. The data are selected from the guidance route data stored in the guidance route memory 34 which are set by the route search processing unit 32, and the guidance route drawing unit 38 produces the guidance route drawing data for superimposing the guidance route on the map image. The mark image drawing unit 40 generates the vehicle position mark at the vehicle position after the map matching is processed, and produces the drawing data for generating a cursor mark having a specific shape.

The aforementioned route search processing unit 32 corresponds to the route search means, the guidance information setting unit 20 corresponds to the guidance information setting means, and the intersection guidance unit 18 corresponds to the intersection guidance means.

The navigation system of this embodiment having the above construction provides the display of the intersection guidance information in parallel with the image display of the map surrounding the vehicle position during route guidance. The operation of the display will now be explained.

Figure 5:
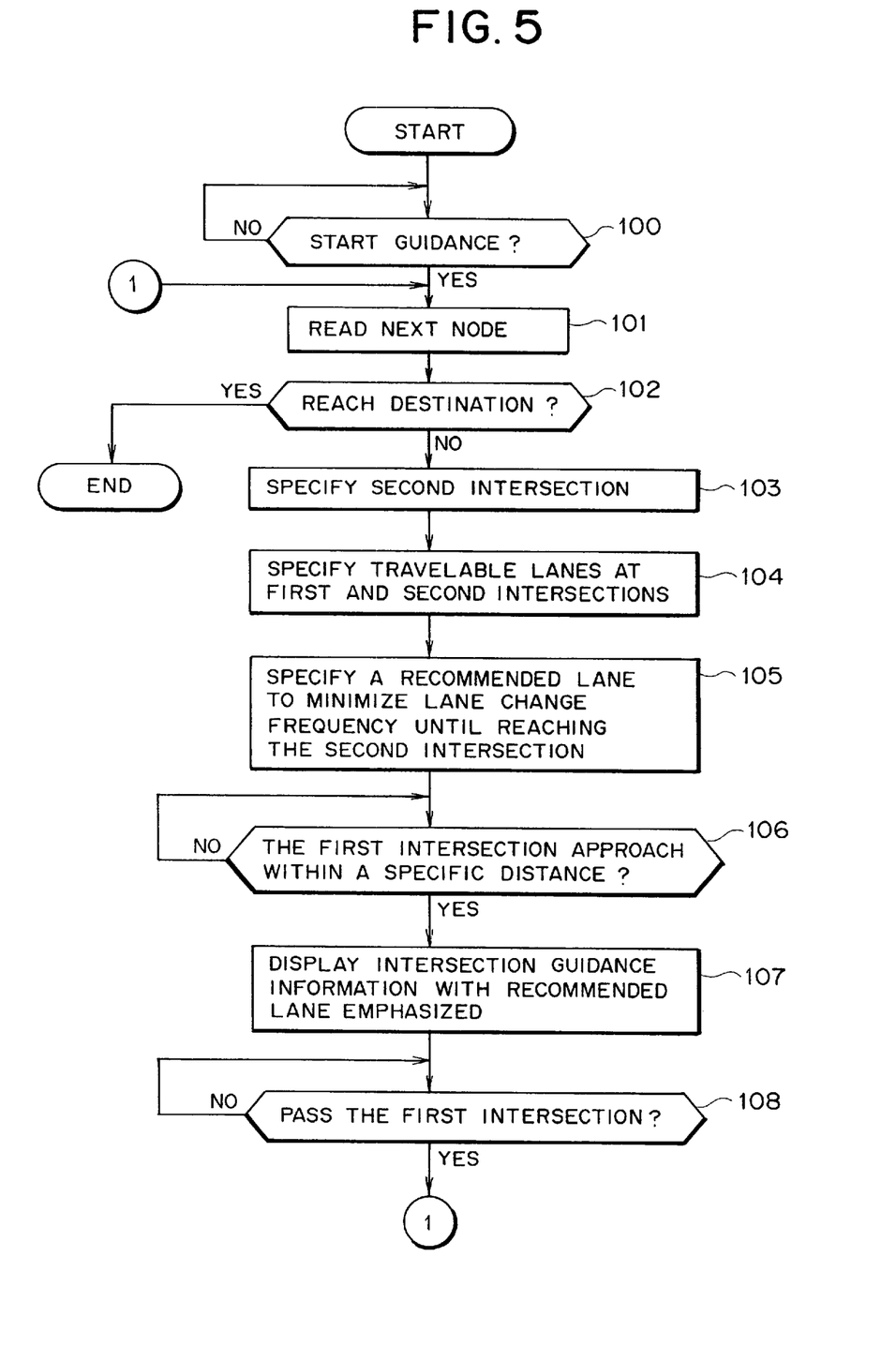

FIG. 5 is a flow chart illustrating the operation procedure of the navigation system in the display of the intersection guidance information, which is executed in parallel with the display operation of a guidance route during route guidance.

When the route guidance mode key of the remote control unit 4 is pressed, a specific route guidance operation is started (step 100). For example, the guidance route drawing unit 38 reads out the nodes on the guidance route stored in the guidance route memory 34, selects the data stored in the area of the map image displayed at that time out of the links connecting these nodes, and draws a thick emphasized guidance route to superimpose it on the map image corresponding to the links.

In parallel with this display operation of the guidance route, the route search processing unit 32 reads out the next node on the guidance route from the guidance route memory 34 (step 101), and judges whether or not the node read out is the node ND of the destination (step 102). The guidance route data stored in the guidance route memory 34 contain the nodes N1, N2, . . . corresponding to the transit points along the way and the node ND corresponding to the destination. If the node read out is the node ND of the destination, the intersection guidance operation is terminated. If the node read out is an intersection node other than the destination node, the data specifying the intersection node (the node corresponding to the first intersection) are transferred to the intersection guidance unit 18 and the guidance information setting unit 20.

Next, the guidance information setting unit 20 specifies the second intersection, namely, the intersection that the vehicle passes after passing the first intersection, where the vehicle makes a right-turn or a left-turn (step 103).

Figure 6:
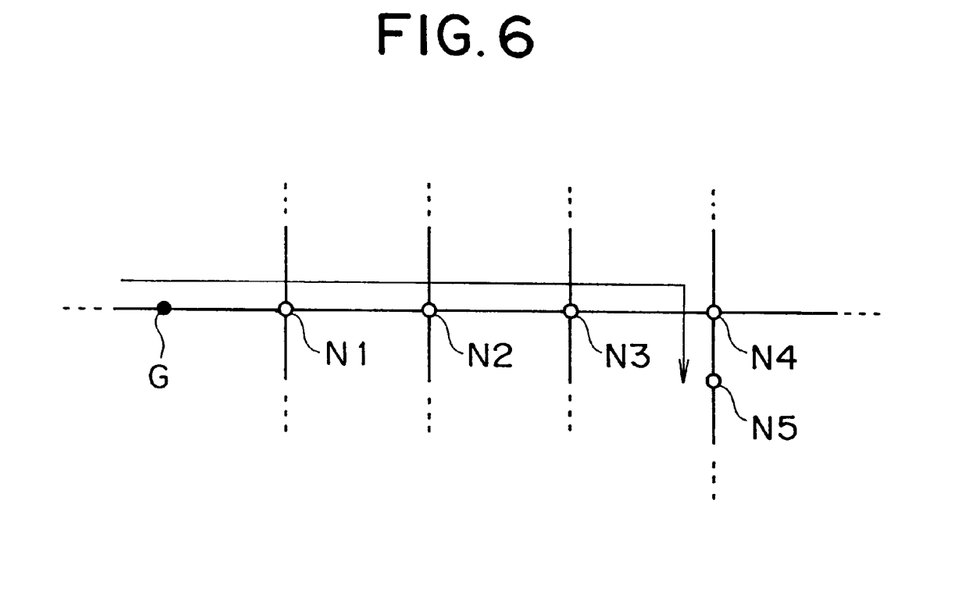
FIG. 6 a chart explaining a method of specifying the second intersection.

A method of specifying the second intersection will now be described. FIG. 6 is a chart explaining a method of specifying the second intersection. In the drawing, the links corresponding to the roads are illustrated by "straight lines", and the nodes connecting these links are shown by "○". The vehicle is assumed to advance from the vehicle position G to the node N1 and make a right-turn at the node N4 to the node N5. Here, the node N1 corresponds to the first intersection, and the node N4 corresponds to the second intersection. In this case, the vehicle position G can be acquired from the vehicle position calculating unit 30. The nodes N1–N5 corresponding to the guidance route can be acquired from the route search processing unit 32. To acquire the above node N4 will specify the second intersection. Next, the method of obtaining the node N4 corresponding to the second intersection will be described.

The link numbers of the links for which one end constitute this node are extracted with reference to the connection node table corresponding to the nodes, and the numbers of the nodes on the other ends of the links are extracted on the basis of the link numbers with reference to the link table. Thus, the acquisition of the numbers of the nodes on the other ends of the links will allow calculating the orientations of the links on the basis of the normalized longitudes and latitudes of the node of interest and the node on the other end thereof. In the example shown in FIG. 6, the calculation results of the orientation of the link connecting the node N3 and the node N4 and the orientation of the link connecting the node N4 and the node N5 will allow specifying the second intersection where the vehicle should make the right turn.

As the second intersection is specified in this manner, guidance information setting unit 20, using the map data (mainly the intersection unit) stored in the data buffer 10, specifies the lanes that the vehicle is permitted to travel along the guidance route in each of the first intersection and the second intersection (step 104).

Next, among the lanes that the vehicle is permitted to travel in the first intersection and the second intersection, specified at step 104, the guidance information setting unit 20 specifies the travel lane (recommended travel lane) whereby the vehicle makes the fewest lane changes until reaching the second intersection (step 105).

Figure 7:
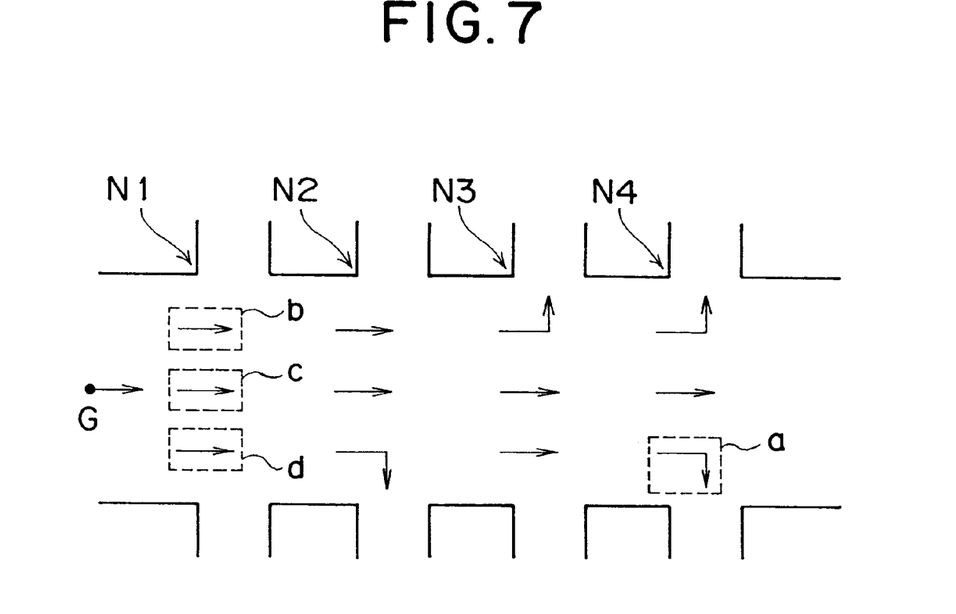
FIG. 7 a chart explaining the processing executed at step 104 in FIG. 5.

FIG. 7 is a chart explaining the contents of the processing executed at step 104. In the same manner as shown in FIG. 6, the vehicle is assumed to advance to the node N1 from the vehicle position G and make the right-turn to the node N5 at the node N4. It is also assumed in regard to the lane configuration in each of the nodes N1–N4 that the node N1 provides three directly advancing lanes, the node N2 provides a right-turn and two directly advancing lanes, the node N3 provides two directly advancing lanes and a left-turn lane, and the node N4 provides a right-turn, directly advancing, and left-turn lanes, as shown in FIG. 7. In this case, it can be specified that the lane in which the vehicle is permitted to travel at the node N4 corresponding to the second intersection is the lane a, and the lanes in which the vehicle is permitted to travel at the node N1 corresponding to the first intersection are any of the lanes b, c, d, as shown in FIG. 7.

Figure 8:
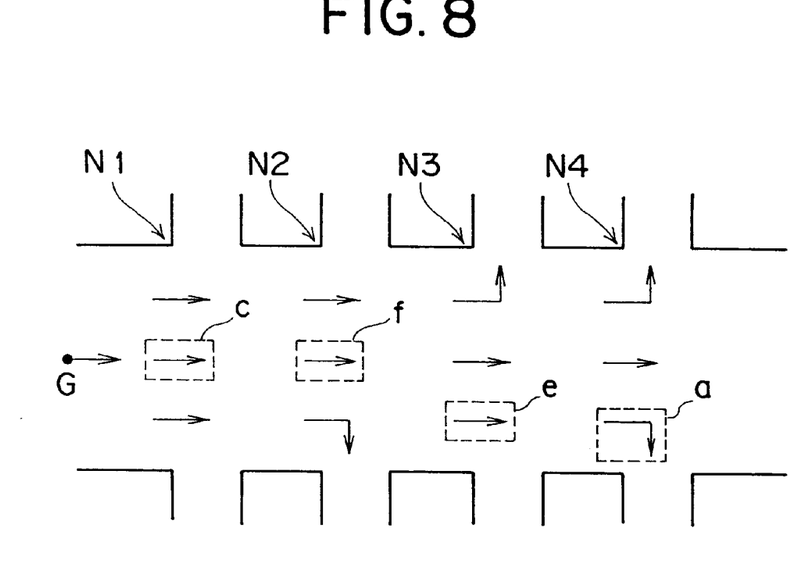
FIG. 8 a chart explaining the processing executed at step 105 in FIG. 5.

FIG. 8 is a chart explaining the processing executed at step 105. As the lane a is specified as the lane that the vehicle is permitted to travel at the node N4 corresponding to the second intersection, at the node N3 one node before, the lane e is specified as the travel lane that does not involve a lane change in advancing to the lane a at the node N4. As the lane e is specified as the travel lane at the node N3, at the node N2 one node before, the lane f is specified as the travel lane that reduces the frequency of lane changes to the minimum in advancing to the lane e at the node N3. As the lane f is specified as the travel lane at the node N2, at the node N1 one node before (the node corresponding to the first intersection), the lane c is specified as the travel lane that does not involve a lane change in advancing to the lane f at the node N2. As a result, a combination of the lane c, the lane f, the lane e, and the lane a is specified as the recommended travel lane that minimizes the frequency of lane changes until the vehicle reaches the second intersection.

In this manner, in the direction facing to the node corresponding to the first intersection from the node corresponding to the second intersection, specifying as the travel lane the lane that minimizes the frequency of lane changes between the adjoining nodes will lead to specifying the recommended travel lane that minimizes the frequency of lane changes until the vehicle reaches the second intersection.

Next, the guidance information setting unit 20 outputs the information regarding the guidance information including the specified recommended travel lane to the intersection guidance unit 18. Receiving the guidance information, the intersection guidance unit 18 produces, on the basis of the guidance information, the drawing data for the intersection guidance information to display the recommended travel lane with emphasis.

In parallel to producing the drawing data, the intersection guidance unit 18 judges whether or not the first intersection is approaching within a specific distance from the vehicle position (step 106). Specifically, the intersection guidance unit 18 calculates the lengths of the links lying on the route before the first intersection, on the basis of the map data (road unit, etc.) stored in the data buffer 10, and determines whether the lengths have -become shorter than a specific value (for example, 300 m) to thereby judge whether the first intersection approaches within the specific distance or not. If the first intersection is beyond the specific distance, the judgment at step 106 is repeated.

If the first intersection approaches within the specific distance, the judgment becomes affirmative at step 106 and the intersection guidance unit 18 outputs the drawing data of the produced intersection guidance information to the image-synthesizing unit 22. As the result, the recommended travel lane is displayed with emphasis on the display screen of the display unit 7 as the intersection guidance information (step 107).

Figure 9:
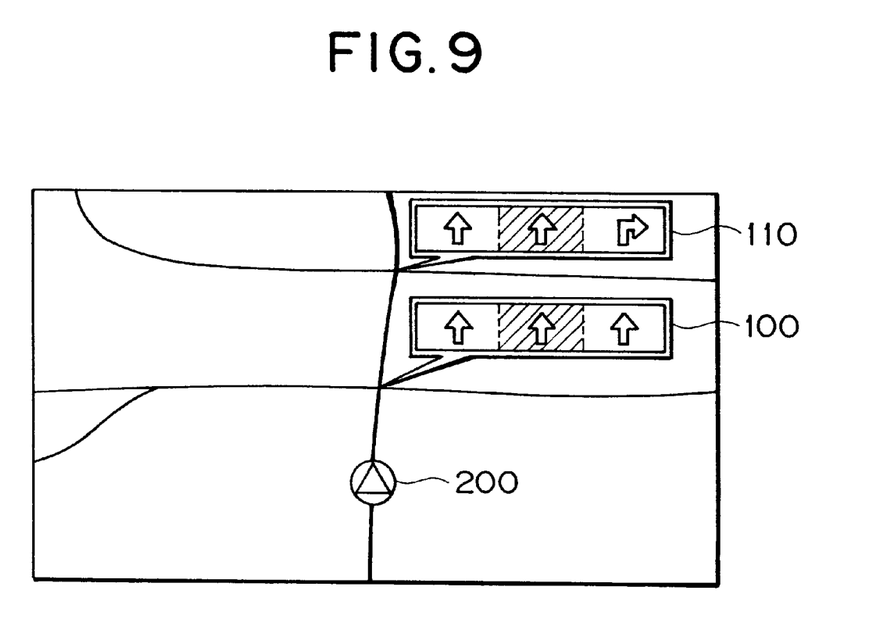
FIG. 9 a chart illustrating an example of displaying the intersection guidance information.

FIG. 9 illustrates an example of displaying the intersection guidance information. The example shown in FIG. 9 corresponds to the recommended travel lane shown in FIG. 8, in which intersection guidance information 100 corresponds to the node N1 shown in FIG. 8, and intersection guidance information 110 corresponds to the node N2 shown in FIG. 8. A vehicle position mark 200 is displayed at a specific position on the lower part of the display center. In the intersection guidance information 100 corresponding to the node N1, only the center lane of the three is emphatically displayed in correspondence with the lane c as the recommended travel lane (shown by hatching in FIG. 9). Also, in the intersection guidance information 110 corresponding to the node N2, only the center lane of the three is emphatically displayed in correspondence with the lane f as the recommended travel lane.

As shown in FIG. 9, since the recommended travel lane is emphatically displayed as the intersection guidance information, this embodiment provides the driver with the opportunity to select a more appropriate travel lane, as compared with the conventional system that displays all the lanes that the vehicle can take at each of the intersections. Further, since the embodiment displays the intersection guidance information 110 corresponding to the intersection that the vehicle passes next, at the same time in addition to the intersection guidance information 100 corresponding to the first intersection, the driver is able to recognize the appropriate travel lane in advance, even in the case where the distance between the first intersection and the next intersection is short.

When the intersection that the vehicle passes after passing the first intersection is not included within the display area for the map image, the intersection guidance information 110 cannot be presented in association with the intersection display position. However, in such a case, it is only needed to set a specific display position in advance within the display area for the map image and display the intersection guidance information 110 at this display position.

Thereafter, the intersection guidance unit 18 judges whether or not the vehicle has passed the first intersection (step 108). If not, the judgment at step 108 is repeated. If the vehicle has passed the first intersection, the affirmative judgment is made at step 108, and the processing returns to the step 101 and repeats the operation after the read-out of the next node.

Thus, in the navigation system of this embodiment, in executing the route guidance processing based on the guidance route set by the route search processing unit 32, the guidance information setting unit 20 provides a recommended travel lane as the intersection guidance information concerning the first intersection that the vehicle is going to pass, considering the conditions of passage at the second intersection that the vehicle passes after the first intersection, where the vehicle makes a right or left turn, and the intersection guidance unit 18 emphatically displays the recommended travel lane as the intersection guidance information, in accordance with the setting of the recommended travel lane. In this manner, the navigation system provides guidance concerning the first intersection that the vehicle is going to pass, in consideration of the conditions of passage at the second intersection that the vehicle passes after the first intersection, and the driver easily attains an appropriate travel state. Especially in this embodiment, the guidance information setting unit 20 sets as a recommended travel lane the travel lane that realizes the minimum frequency of lane change until the vehicle reaches the second intersection. Therefore, the driver is able to travel with the minimum frequency of lane change, referring to the display of the intersection guidance information including the recommended travel lane, so that the driver can avoid an abrupt lane change or a useless lane change after passing the first intersection.

The present invention is not limited to this embodiment, and various modifications and changes are possible within the scope and spirit of the invention. For example, the display example shown in FIG. 9 provides, other than the intersection guidance information 100 corresponding to the node N1, namely, the first intersection, the intersection guidance information 110 corresponding to the node N2, namely, the intersection that the vehicle passes after the first intersection. However, the display may be designed to provide only the intersection guidance information 100 corresponding to the first intersection, or in contrast, it may be made to provide guidance information for more than two intersections.

Figure 10:
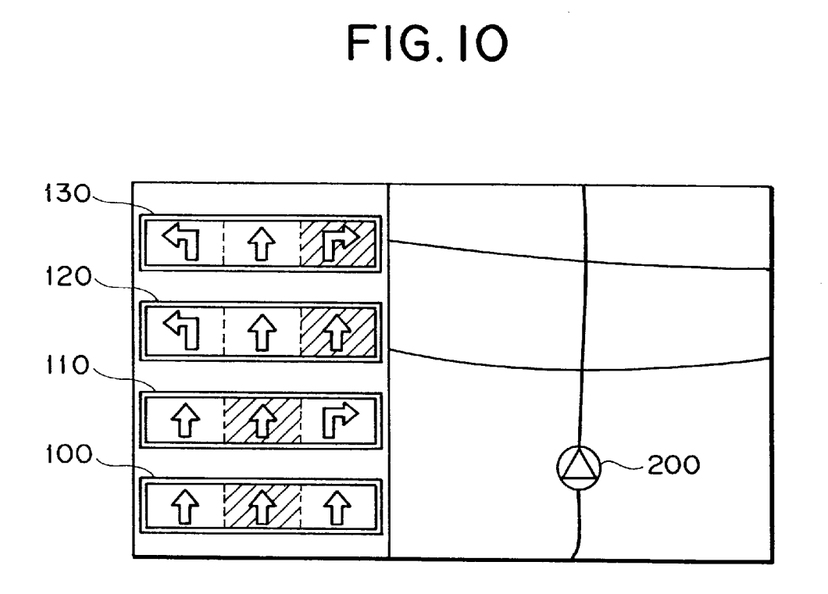
FIG. 10 a chart illustrating an example of displaying the intersection guidance information, with an exclusive area provided.

Further, in the display example shown in FIG. 9, the intersection guidance information 100, 110 are displayed in superposition on the map image. However, an exclusive area for displaying the intersection guidance information may be provided separately from the display area for the map image. FIG. 10 is a chart illustrating an example of displaying the intersection guidance information in an exclusive area. In the drawing, the display area is divided into two areas, right and left, and the left display area is the exclusive area for displaying the intersection guidance information and the right is the display area for the map image. In the exclusive area for the intersection guidance information, four intersection guidance information 100, 110, 120, 130 are displayed in correspondence with the recommended travel lanes shown in FIG. 6. When the exclusive area for the intersection guidance information is provided in this manner, the driver is able to refer to plural intersection guidance information, including an intersection that does not lie in the display area for the map image, to grasp the recommended travel lanes over a wider distance.

Further in FIG. 9 and FIG. 10, the intersection guidance information provides a display of all the lanes in the intersections and further the displays with emphasis only the recommended travel lanes. However, it may provide only the recommended travel lanes with the other lanes hidden on the display. Or, it may display the recommended travel lanes and the lanes that the vehicle can travel, and it may hide the lanes that the vehicle cannot travel on the display.

Figure 11:
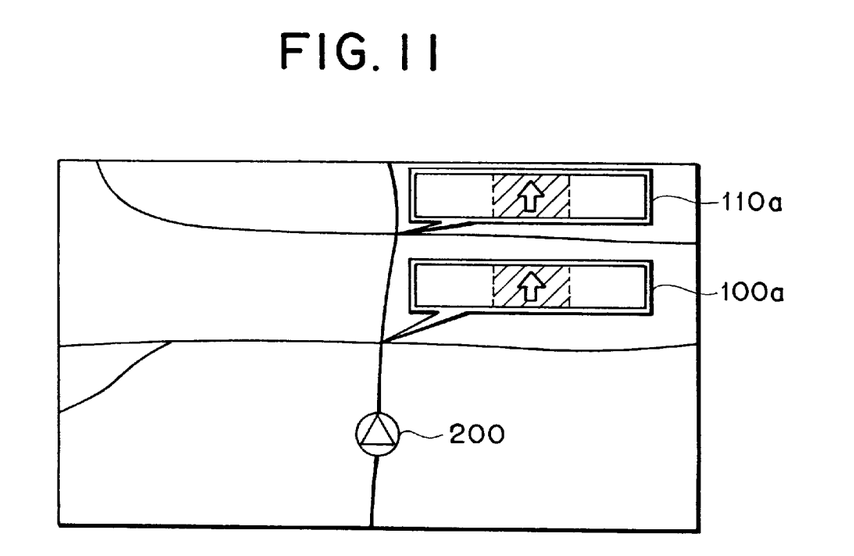
FIG. 11 a chart illustrating an example of displaying the intersection guidance information including only a recommended travel lane.

FIG. 11 illustrates an example of displaying the intersection guidance information in which only the recommended travel lane is displayed. As intersection guidance information 100a and 110a shown in FIG. 11, displaying only the recommended travel lanes will simplify the contents of display. Further, in the case of displaying only the recommended travel lanes, as shown in FIG. 11, the intersection guidance information may save an emphatic display with a color or the like, and it may provide only the display by an arrow that simply indicates the recommended travel lane, or the like.

Figure 12:
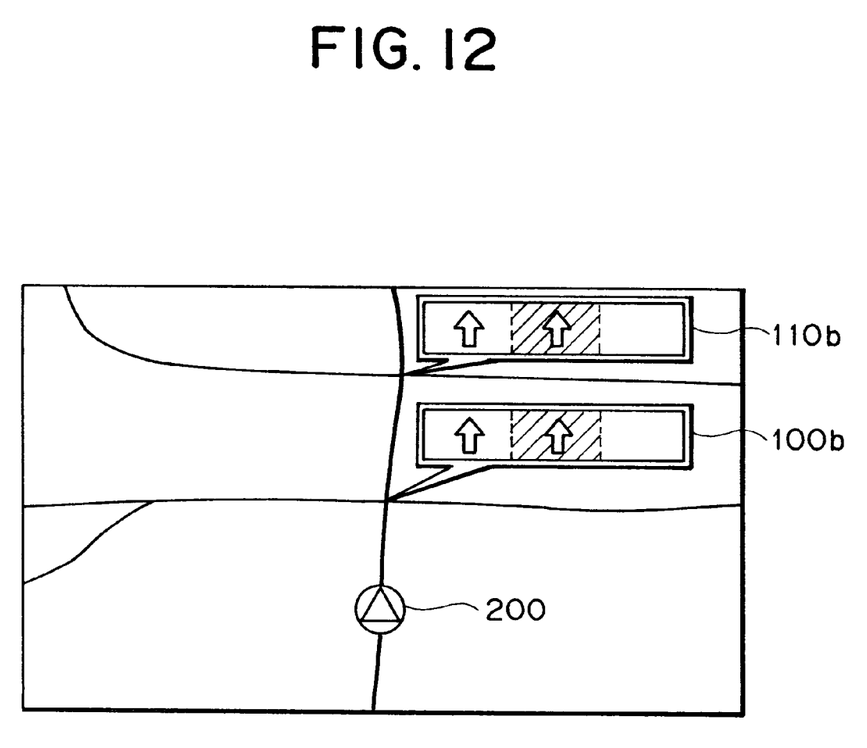
FIG. 12 a chart illustrating an example of displaying the intersection guidance information, which presents the recommended travel lanes and other possible travel lanes and does not present the lanes where travel is not possible.

FIG. 12 illustrates an example of displaying the intersection guidance information which presents the recommended travel lanes and the travelable lanes and does not present the lanes where traveling is not possible. As the intersection guidance information 100b and 110b shown in FIG. 12, the display can be simplified by presenting only the recommended travel lanes and travelable lanes, without presenting the lanes where traveling is not possible, so that the driver may easily grasp visually the lanes in which the vehicle cannot travel.

Although the above-described embodiments provide the user with the intersection guidance information by presenting the image display on the screen of the display unit 7, the intersection guidance information may be communicated to the user by outputting specific guidance voice instructions that explain the recommended travel lanes.

The above-described embodiments also have assumed the intersection that the vehicle passes after the first intersection, where the vehicle makes a right or left turn, is the second intersection. However, the second intersection may be specified on the basis of other conditions. For example, the intersection that the vehicle passes next after passing the first intersection may be specified as the second intersection. In this manner, it is conceivable that an optimum recommended travel lane can be provided in most cases by considering only two intersections from the current vehicle position. In this case, the setting procedure of a recommended travel lane can be simplified.

Further, the above-described embodiments have assumed the intersection that the vehicle passes after the first intersection, where the vehicle makes a right or left turn, is the second intersection. However, if there continue many intersections where the vehicle is to go straight, and if there exist many intersections between the first intersection and the second, it may be that the acquisition of a recommended travel lane in consideration of all the intersections requires considerable time for calculations. In such a case, it is possible to establish an upper limit for the number of intersections (for example, 10 intersections) that are taken into consideration for the calculation, or to establish an upper limit of time on the basis of an estimated time for the travel of the set guidance route (for example, 30 minutes), or to establish an upper limit of distance (for example, 10 km); and it is only needed to set a recommended travel lane in consideration of the intersections that lie within the range of the upper limit. Also, if it is difficult to make a judgment of choosing the travel lanes, all the travelable lanes at the first intersection that the own vehicle is going to pass can be chosen for guidance.

Additionally, there exists a type of road in which the number of lanes in the adjoining intersections is coincident and the lanes are dislocated for one lane. Therefore, it is preferable to include information as to the state of connection of the lanes in the lane information as additional information, or it is preferable to associate each of the plural lanes with one link and clarify the relation between the lanes in each adjoining intersection.

Figure 13A:
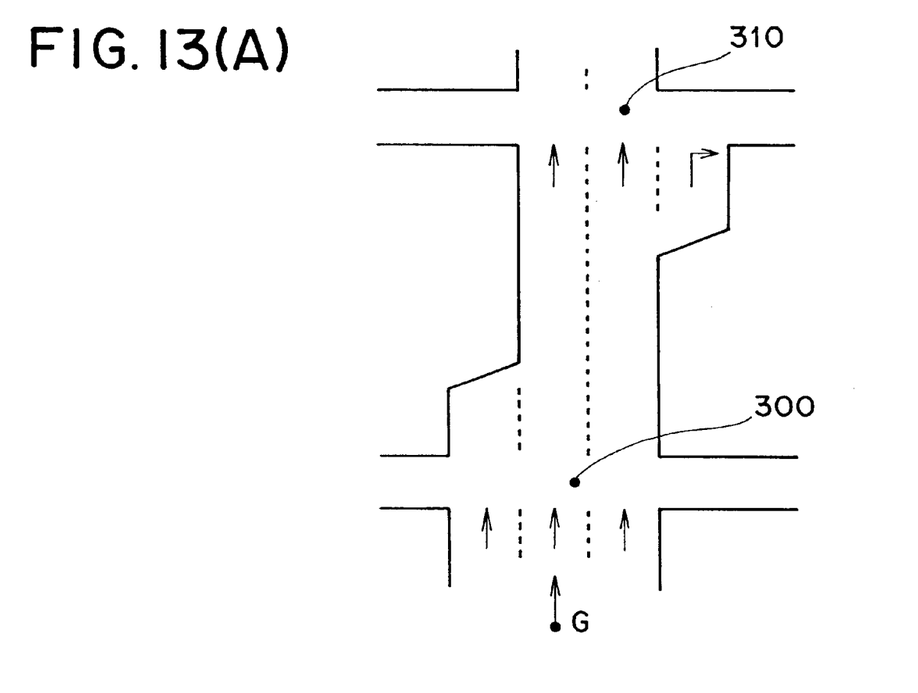
FIG. 13 a chart illustrating an example of displaying the intersection guidance information including specific additional information.
Figure 13B:
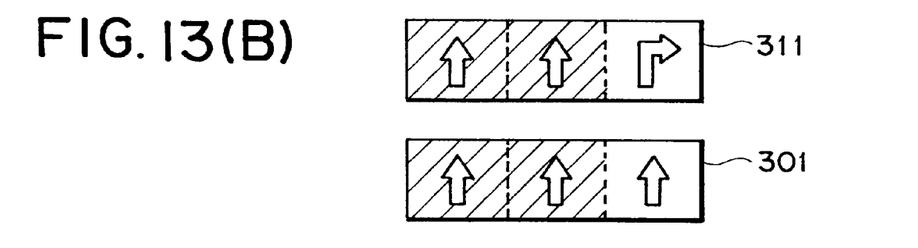

FIG. 13 illustrates an example of displaying the intersection guidance information in including specific additional information. For example, as shown in FIG. 13(A), all three lanes are directly advancing at the intersection 300, but the lanes are reduced to two lanes after passing the intersection 300, and one right-turn lane is added before the intersection 310 to make three lanes again. In such a guidance route, the vehicle is assumed to advance directly and pass each of the intersections 300, 310. In this case, the intersection guidance information according to the above-described embodiments, as shown in FIG. 13(B), provides the display with emphasis of two lanes, the left and the center, as the intersection guidance information 301 of the intersection 300, and also provides the display with emphasis of two lanes, the left and the center, as the intersection guidance information 311 of the intersection 310 as well. However, it is preferable to provide the display with emphasis of two lanes, the center and the right, because the lanes are reduced after passing the intersection 300 along the actual travel route and such a display will match the actual travel route more accurately.

Figure 13C:
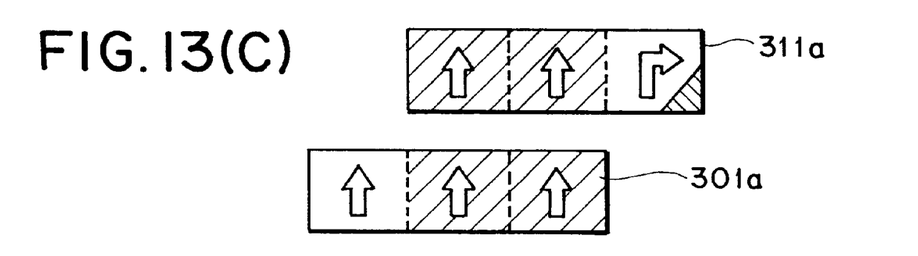

In this case, if the additional information is given in such a manner that the right lane and the center lane at the intersection 300 are associated with the center lane and the left lane at the intersection 310, respectively, the right lane and the center lane are displayed with emphasis in the intersection guidance information 301a of the intersection 300, and the center lane and the left lane are displayed with emphasis in the intersection guidance information 311a of the intersection 310, as shown in FIG. 13(C), whereby the display will match the actual travel route more accurately. In addition, a dislocation of the display positions of the intersection guidance information 301a and 311a by a specific distance will make it easy for the driver to visually grasp the associated lanes, in relation to the actual travel lanes. Further, as shown in the intersection guidance information 311a, providing the right-turn lane with a display different from the other lanes (in FIG. 13(C), slant line and hatching on the lower right corner) will notify the driver visually that the right-turn lane is being added just before the intersection 310.

According to the invention as described above, since the navigation system is able to provide guidance concerning the first intersection that the vehicle is going to pass in consideration of the conditions of passage at a second intersection that the vehicle passes after the first intersection, the driver can easily attain an appropriate travel state. Particularly, since the navigation system provides such guidance information so as to minimize the frequency of lane changes before the vehicle reaches the second intersection, the driver is able to achieve the minimum frequency of lane change, to thereby avoid an abrupt lane change or a useless lane change after passing the first intersection, and to thereby attain an appropriate travel state.

What is claimed is:

1. A navigation system comprising:
   a route search means that sets a travel route of a vehicle by executing a route search processing;
   a guidance information setting means that sets, on the basis of the travel route, guidance information concerning a first intersection that the vehicle passes, in consideration of the conditions of passage at a second intersection that the vehicle is to pass thereafter; and
   an intersection guidance means that communicates the guidance information graphically through a visual display; wherein the intersection guidance means displays all the lanes at the intersections as intersection guidance information, and further displays with emphasis only the recommended travel lanes.

2. A navigation system as claimed in claim 1, wherein the guidance information setting means sets, on the basis of travelable lanes at the first intersection and the second intersection, the guidance information that minimizes the frequency of lane changes until the vehicle reaches the second intersection.

3. A navigation system as claimed in claim 1, wherein a display area for displaying the guidance information concerning the first intersection and the second intersection and a display area for a map image are divided.

4. A navigation system as claimed in claim 1 or claim 2, wherein the second intersection is an intersection at which the vehicle next makes a right-turn or a left-turn.

5. A navigation system as claimed in claim 2, wherein the intersection guidance means displays by arrows only recommended travel lanes at the intersections as intersection guidance information.

6. A navigation system as claimed in claim 2, wherein the intersection guidance means displays the recommended travel lanes and the travelable lanes at the intersections as intersection guidance information, and does not display the lanes that the vehicle is not permitted to travel.

7. A navigation system as claimed in claim 2, wherein, when the vehicle approaches the first intersection within a specific distance, the guidance information setting means displays the guidance information concerning the first intersection.

8. A navigation system as claimed in claim 2, wherein, when the vehicle passes the first intersection, the guidance information setting means deletes the guidance information concerning the first intersection.

9. A navigation system as claimed in claim 2, wherein the intersection guidance means displays only recommended travel lanes at the intersections as intersection guidance information, and does not display the other lanes.

10. A navigation system comprising:

a route search means that sets a travel route of a vehicle by executing a route search processing;

a guidance information setting means that sets, on the basis of the travel route, guidance information concerning a first intersection that the vehicle passes, in consideration of the conditions of passage at a second intersection that the vehicle is to pass thereafter; and an intersection guidance means that graphically displays the guidance information concerning the first intersection and the guidance information concerning the second intersection with a dislocation of display positions thereof, wherein the intersection guidance means displays the lanes at the intersections as intersection guidance information, and further displays with emphasis only the recommended travel lanes.

11. A navigation system as claimed in claim 10, wherein, when the lanes are reduced after passing the first intersection, the intersection guidance means displays the guidance information concerning the first intersection and the guidance information concerning the second intersection with a dislocation of display positions thereof.

12. A navigation system as claimed in claim 10, wherein, when a right-turn lane or a left-turn lane is added at the second intersection, the intersection guidance means displays the guidance information concerning the first intersection and the guidance information concerning the second intersection with a dislocation of display positions thereof.

13. A lane guidance method in a navigation system comprising:

executing a route search to a destination to set a travel route;

setting, on the basis of the travel route, lane guidance information concerning a first intersection that the vehicle is going to pass, in consideration of the conditions of passage at a second intersection that the vehicle is to pass thereafter;

and presenting the lane guidance information graphically through a visual display; wherein the lane guidance information displays all the lanes at the first intersection and the second intersection, and further displays with emphasis only the recommended travel lanes.

14. A lane guidance method in a navigation system, as claimed in claim 13, wherein the lane guidance information displays recommended travel lanes and travelable lanes at the first intersection and the second intersection, and does not display the lanes that the vehicle is not permitted to travel.

15. A lane guidance method in a navigation system, as claimed in claim 14, wherein the second intersection is an intersection at which the vehicle next makes a right-turn or a left-turn, and the lane guidance information minimizes the frequency of lane charges until the vehicle reaches the second intersection.

16. A lane guidance method in a navigation system, as claimed in claim 14, wherein, when the vehicle passes the first intersection, the lane guidance information displays with emphasis a recommended travel lane.

* * * * *